United States Patent [19]
Baume et al.

[11] Patent Number: 5,211,076
[45] Date of Patent: May 18, 1993

[54] CYCLE PEDAL ARRANGEMENT

[75] Inventors: Hugues Baume, St. Benin D'Azy; Jean-Louis Chretien, Cour les Barres, both of France

[73] Assignee: Look S.A., Nevers cedex, France

[21] Appl. No.: 724,028

[22] Filed: Jul. 1, 1991

[30] Foreign Application Priority Data

Jul. 5, 1990 [DE] Fed. Rep. of Germany ....... 4021356
Jul. 5, 1990 [DE] Fed. Rep. of Germany ....... 4021357

[51] Int. Cl.⁵ .......................... G05G 1/14; A43B 5/00
[52] U.S. Cl. .................................. 74/594.6; 74/594.4; 36/131; 36/132
[58] Field of Search .................. 74/594.4, 594.6; 36/131, 132

[56] References Cited

U.S. PATENT DOCUMENTS

| | | | |
|---|---|---|---|
| 4,377,952 | 3/1983 | Gamondes | 36/131 X |
| 4,662,090 | 5/1987 | Solano | 74/594.6 X |
| 4,836,047 | 6/1989 | Alcamo | 74/594.4 X |
| 4,856,365 | 8/1989 | Romano | 74/594.6 |
| 4,893,420 | 1/1990 | Bezin et al. | 74/594.6 X |
| 4,907,355 | 3/1990 | Allen et al. | 74/594.6 X |
| 4,928,549 | 5/1990 | Nagano | 74/594.6 |
| 4,936,164 | 6/1990 | Forke | 36/131 X |
| 4,969,373 | 11/1990 | Good | 74/594.6 X |
| 5,027,675 | 7/1991 | McCune et al. | 74/594.6 |
| 5,048,369 | 9/1991 | Chen | 74/594.6 |

Primary Examiner—Vinh T. Luong
Attorney, Agent, or Firm—Townsend and Townsend Khourie and Crew

[57] ABSTRACT

A cycle pedal arrangement comprises a cycle pedal and an associated shoe. In this arrangement the shoe has a contour in at least a region of its sole which is matched to at least one essentially complementary contour formed in a region of the cycle pedal and cooperates with the latter in at least a force transmitting manner.

16 Claims, 5 Drawing Sheets

CYCLE PEDAL ARRANGEMENT

BACKGROUND OF THE INVENTION

The invention relates to a cycle-pedal arrangement comprising a cycle pedal and an associated shoe.

The shoes of a cyclist and the pedals of a bicycle are frequently not ideally matched to one another so that an ideal force transmission from the shoe to the pedal and thus from the cyclist to the pedal crank is not always ensured. There are admittedly safety pedals for cyclists with associated shoes in which the shoe and pedal can be latched together, however a latch between the shoe and the pedal is not always desirable. Thus, even with such bicycle pedal arrangements for racing bicycles, the bicycle pedal can be provided at its pedal face remote from the receiving device with a normal pedal surface, in order that the pedal can also be used when latching of the safety latch between the shoe and the pedal is not desired. With this use of the pedal the shoe can however be placed in a plurality of possible positions on the pedal, so that an ergonomically favourable position is not always found.

It is thus the object of the invention to design a cycle pedal arrangement of the initially named kind such that even with frequent mounting and dismounting an ideal force transmission is ensured between the shoe and the pedal, and such that even when using safety pedals, and preferably when using the pedal face of the pedal not provided with a receiving device, a reproducable and ergonomically favourable positioning of the shoe is made possible.

This object is satisfied in accordance with the invention in that the shoe has a contour in at least one region of its sole which is matched to an essentially complementary contour formed in at least one region of the bicycle pedal and cooperates with the latter at least in a force transmitting manner.

Through this layout of the pedal and sole a particularly good force transmission is provided from the shoe to the pedal. A particularly advantageous solution is characterized in that the cycle pedal is provided at at least one pedal side with a profile-like contour which can be brought into form matched and force transmitting engagement with the profiled sole.

It is advantageous with this arrangement that the profile-like contours engage into one another and produce an intensive contact between the pedal and the sole.

This is in particular advantageous with cross-country journeys or during journeys with a mountain bike when wet conditions between the sole of the shoe and the pedal greatly reduce the frictional adhesion with customary shoe-pedal combinations.

The bars of the shoe and pedal have a semi-trapezoidal cross-section which permits a particularly good meshed arrangement in which both high force transmission between the shoe and the pedal and also precise fixing of the shoe on the pedal is possible.

The vertical surfaces of the semi-trapezoidal bars of the pedal all face in the forward direction of the pedal which permits a particularly effective force transmission since when pressing the pedal downwardly since the vertical edges or side faces of the sole side bars are pressed against the vertical edges or side faces of the pedal side bars and thus a large area region is available for force transmission. The force transmitted from the shoe to the pedal thereby simultaneously brings about a reliable grip of the shoe on the pedal and counteracts the sliding of the shoe away from the pedal face of the pedal.

Having two bars on the pedal or the sole received in one groove of the sole or pedal respectively enables a fine positioning of the show on the pedal.

One can thus ensure that the maximum deviation of the position of the axis of movement of the joint of the toe close to the foot from the ideal position vertically above the pedal axis amounts to only 3 to 7 mm, in particular to 5 mm.

By having an actuating surface in a region of the sole, one obtains a particularly simple and reliable engagement with a pedal on climbing onto it, in conjunction with a cycle pedal having a pedal fixing device.

A plate can be provided in a recess in the sole for receiving in latching or non-latching engagement the second side of the pivotable pedal. This increases the versatility of the cycle pedal arrangement since an intensive connection can be produced between the cycle pedal and the shoe on sections of the journey in which frequent mounting and dismounting is not necessary.

Through the provision of a cover plate for the recess receiving the plate the area of the sole provided with bars can be increased and thus an effective engagement can be achieved between the sole and the pedal face of a pedal provided with bars. The symmetrical construction of the cover plate allows the use of a single cover plate for the left and right shoes.

Both the shoe and also the pedal can be provided with matched reference markings, the mutual force transmitting engagement of which can be sensed by the cyclist on placing the shoe on the pedal, so that a rapid and reliable alignment of the shoe on the cycle pedal is possible.

If the pedal side abutment is formed at the rear edge of the pedal face then the pedal face abutment is automatically led up to the positioning abutment in the region of the sole during the load free upward and forward movement of the pedal, so that in the subsequent force transmitting forward and downward movement the shoe contacts the pedal in the desired ideal position.

The foot of the cyclist adopts an ergonomically particularly favourable position with the engagement of the abutments on the sole and the pedal which ensures a fixation of the shoe in a longitudinal direction of the shoe such that the axis of movement of a joint of a big toe adjacent the upper portion of the sole lies vertically above the transverse axis of the pedal. In this position a maximum force transmission is ensured between the foot and the pedal. A further advantageous solution of the underlying object is characterised that the cycle safety pedal has at least one abutment at its pedal face remote from the receiving means, with the abutment being engagable with a positioning abutment provided in the region of the sole of the cyclist's shoe.

Through the provision of an abutment and a positioning abutment both the shoe and also the pedal are provided with matched reference markings the mutual force transmitting engagement of which can be sensed by the cyclist when placing the shoe on the pedal, so that a rapid and reliable alignment of the shoe on the cycle pedal is possible.

If the pedal side abutment is formed at the rear edge of the pedal face then the pedal side abutment is automatically led up to the positioning abutment in the region of the sole again during the load free upward forward movement of the pedal, so that in the subsequent force transmitting forward and downward movement the shoe contacts the pedal in the desired ideal position.

It is particularly advantageous if, the sole side positioning abutment is formed directly on the plate, and is in particular formed at the rear edge of the plate.

This ergonomically favourable positioning of the foot on the pedal can, also be provided when using the safety latch.

BRIEF DESCRIPTION OF THE DRAWINGS

The invention will be explained in more detail in the following with respect to examples and with reference to the drawing in which are shown.

DESCRIPTION OF THE PREFERRED EMBODIMENT

Figure 1:
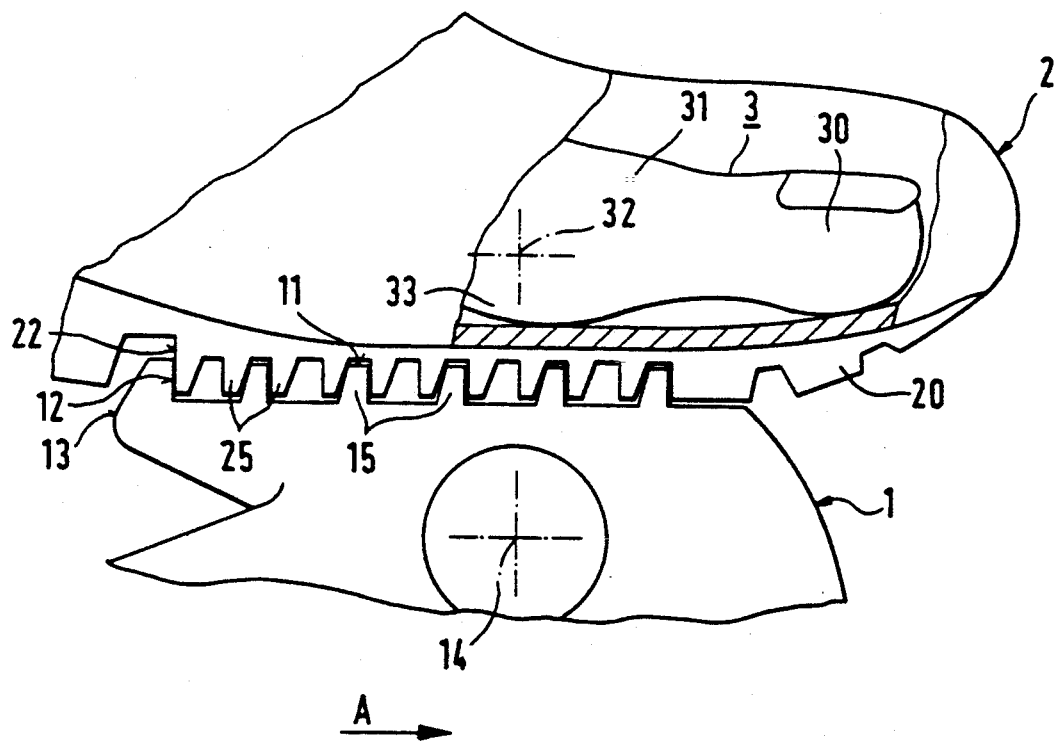
FIG. 1 a first embodiment of the cycle pedal arrangement of the invention, with the shoe placed on the pedal, FIG. 2 a safety pedal with a pedal face provided with bars and a receiving device for a plate, FIG. 3 a profile pairing between the sole and the pedal shortly before mutual engagement, FIG. 4 a profile pairing which is in engagement, FIG. 5 view from below of the sole of a cyclist's shoe provided with a plate, FIG. 6 a view from below of the sole of a cyclist's shoe provided with a cover plate, FIG. 7 a second embodiment of the cycle pedal arrangement of the invention shortly before the placement of the shoe onto the pedal, FIG. 8 a cyclist's shoe placed on the pedal of FIG. 7.

FIG. 1 shows a cycle pedal 1 which is pivotally journalled on a non-illustrated pedal crank about a pedal axle 14.

At its upper pedal face 11 the pedal 1 is provided with bars 15 which extend transversely to the direction of travel A. The pedal face 11 has an abutment 12 at its rear edge 13 with respect to the direction of travel A.

An associated shoe is provided with bars 25 at the sole 20 in the ball region, with the bars extending transversely to the longitudinal direction of the shoe. The bars 25 are formed for meshed engagement with the bars 15 provided on the pedal face 11.

Figure 2:
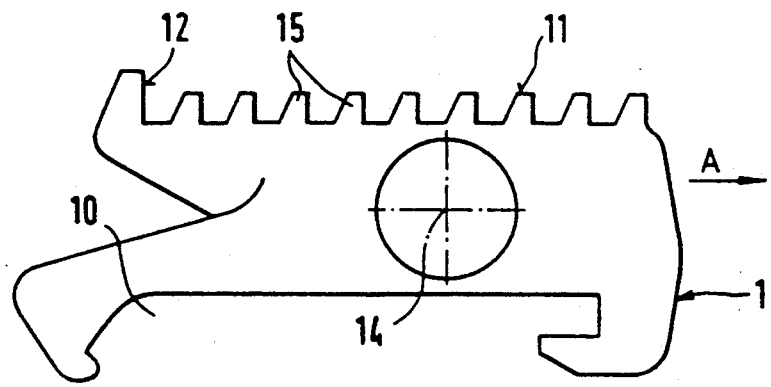

The cooperation of the bars 25 at the shoe side and of the bars 15 at the pedal side will be explained in more detail with respect to FIGS. 2 to 4. FIG. 2 shows a pedal 1 which is provided on the pedal face 11 with a plurality of bars 15 which extend substantially parallel to the pedal axis 14.

The bars 15 and also the bars 25 have in cross-section the shape of a half trapezium so that their one transverse edge extends vertically and the other transverse edge extends obliquely. With this arrangement the vertical edge 16 of the bars 15 of the pedal 1 is forwardly directed in the direction of travel A, whereas the obliquely extending edge 17 of the pedal side bars 15 is disposed at the rear side. At the sole 20 the arrangement is precisely reversed so that the vertical edge 26 of the bars 25 is directed rearwardly with respect to the longitudinal direction of the shoe whereas the obliquely extending edge 27 of the bars 25 is forwardly disposed. In this way there arises, as can be seen from FIG. 4, a mesh between the sole of the shoe 20 and the pedal 1 which enables a particular good force transmission from the shoe to the pedal via the closely contacting vertical edges 16 and 26.

In order to prevent the sole 20 of the shoe undesirably sticking to a pedal 1 by suction the obliquely extending edges 17 and 27 can have different angles of inclination so that they only contact over a small portion of their area.

Figure 3:
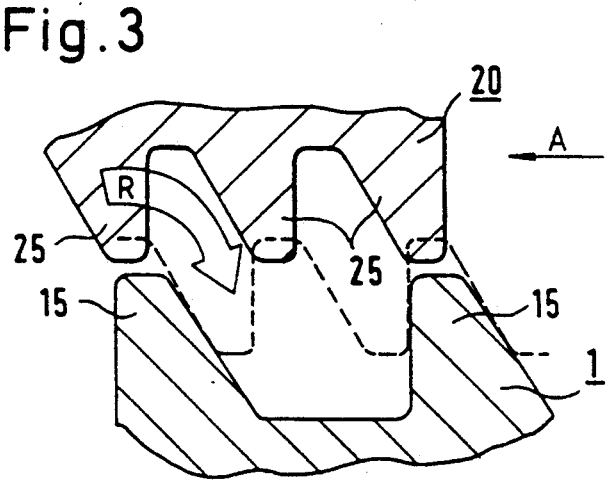

Should the bars 25 and the bars 15 lie opposite to one another when the shoe side positioning abutment 22 contacts the pedal side abutment 12 then, in the case of an elastic construction of the pedal side abutment 12 and/or of the positioning abutment 22, a small displacement of the sole of the shoe to the rear can taken place until a mutual engagement is possible between the shoe side bar contour and the pedal side bar contour (arrow R and broken line in FIG. 3).

Figure 4:
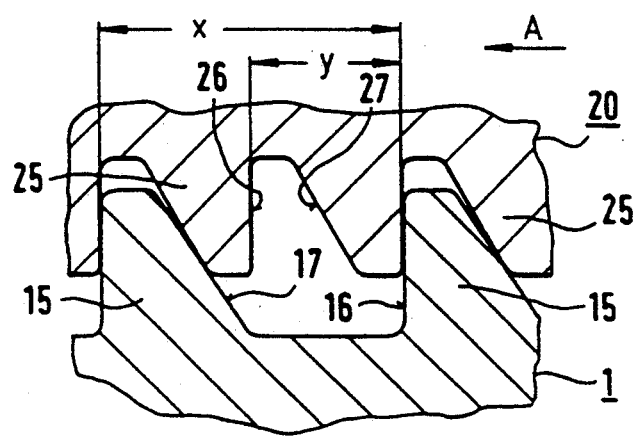

The arrangement of the bars 15 shown in FIGS. 3 and 4 with relatively large spacing is particularly advantageous since in this way a contamination of the pedal face and thus the filling up of the spaces between the bars with dirt is extensively prevented. In order to obtain the finest possible grading of the engagement positions in the longitudinal direction of the shoe, despite the large bar spacing at the pedal face, the spacing between the bars 25 at the shoe side can be made smaller. Thus, for example, in the embodiment of FIGS. 3 and 4, the spacing x between two bars 15 on the pedal 1 corresponds to the spacing between three bars 25 on the sole 20.

The shorter spacing between two bars 25 on the sole 20 (bar peak and bar groove) is designated with y in FIG. 4 and amounts to 3 to 7 mm, in particular to 5 mm. Through this layout it is ensured that the maximum deviation of the position of the axis of movement 32 of the joint 31 close to the foot from the ideal position vertically above the pedal axis 14 amounts to only 3 to 7 mm, in particular to 5 mm.

The differential spacing between the bars described in conjunction with FIGS. 3 and 4 can naturally also be such that the shorter bar spacings are provided on the pedal whereas the larger bar spacings are provided on the shoe sole.

Figure 5:
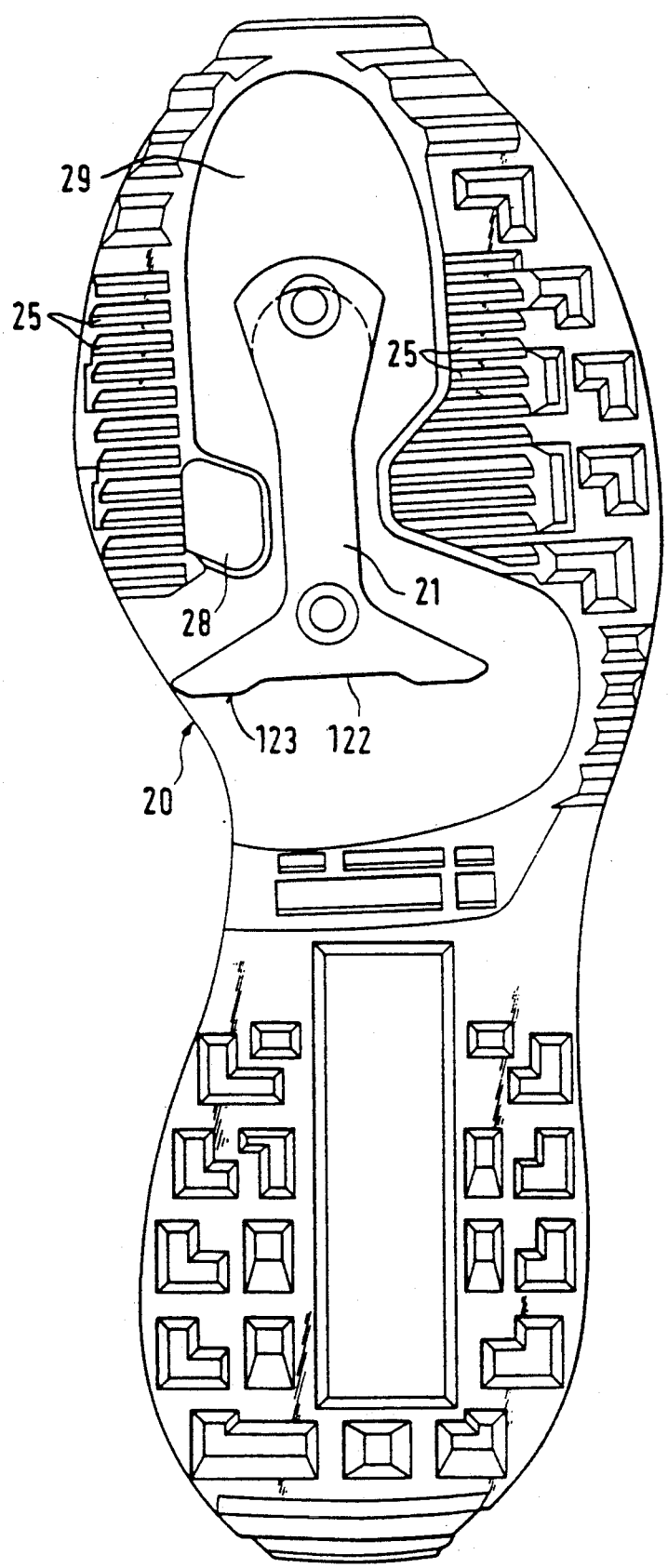

FIG. 5 shows a sole 20 of a cyclist's shoe which has a recess 29 at its front side into which a plate 21 can be inserted in recessed manner. The shoe can in this way be engaged without problem into a receiving device or a latch 10 of a safety pedal 1 provided at the side opposite from the profiled pedal face 11. The shoe can however also be placed with its sole on the profiled pedal face 11. For this purpose the sole 20 of the shoe 2 is provided at both sides alongside the receiving recess 29 with the bars 25 which extend transverse to the longitudinal direction of the shoe. The bars 25 are formed for meshed engagement with the bars 15 provided on the pedal face 11.

Figure 6:
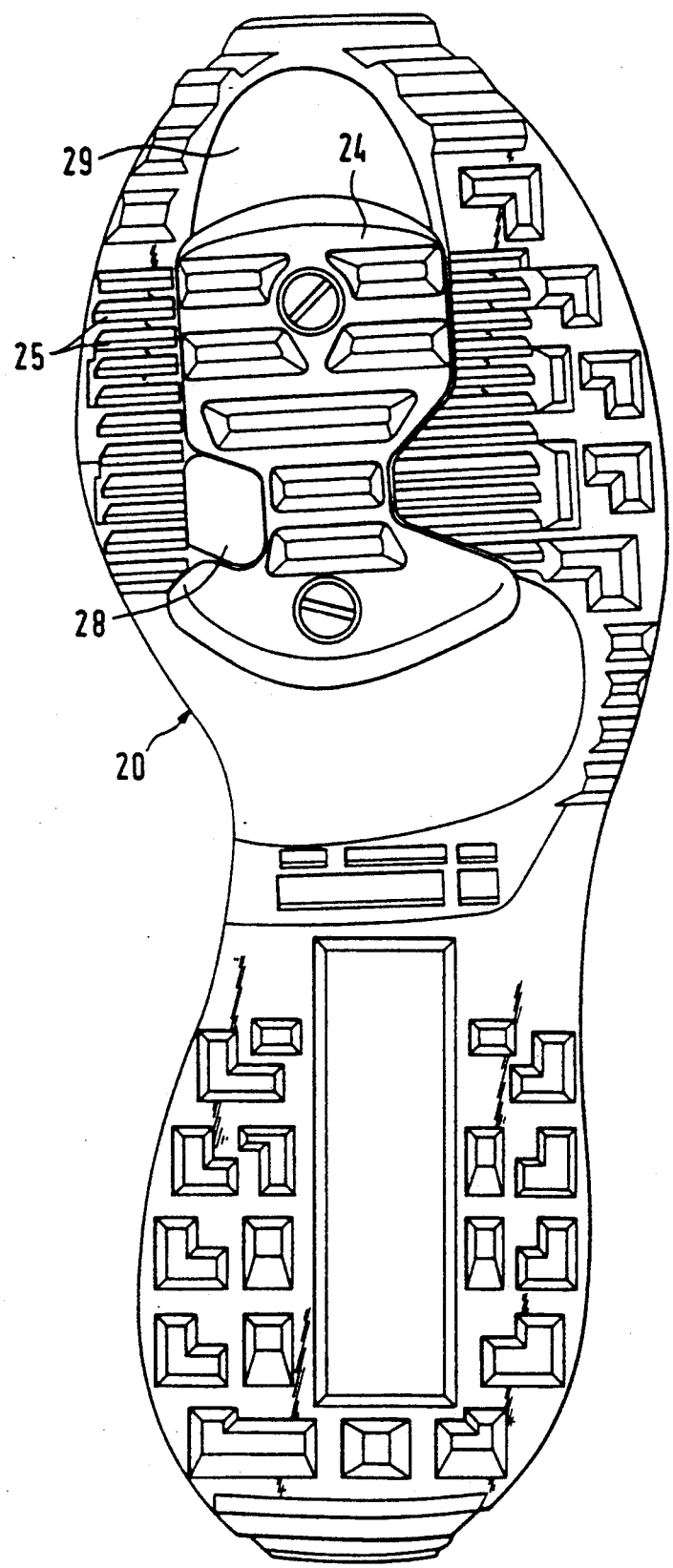

Alongside the plate 21 an actuation surface 28 is provided in the sole 20 which is raised relative to the recess 29 and serves for the actuation of a release device provided on the associated pedal face for a brake device which prevents the rotation of the pedal. The sole is provided in the heel region and in the region of the tip and also in the outer side region with a profile which deviates from the bars 25 and which is not formed for engagement with the profile of the pedal 1. In FIG. 6 the same sole is shown, however with a cover plate 24 being inserted in place of the plate 21. The mounting of the cover plate 24 is effected by two screws which are arranged spaced apart behind one another in the longitudinal direction of the shoe and which are screwed into the same threads as are also used for the mounting of the plate 21. The cover plate 24 can however also be attached in such a way that prior removal of the plate 21 is not necessary. It can for example be secured to the plate 21.

In this arrangement the cover plate 24 covers over the recess 29 provided in the ball region of the foot received in the shoe. The cover plate is likewise provided with profiling which in the illustrated embodiment is different from the profiling of the bars 25. However the cover plate can in principle also have the same profile shape as the bars 25 and then the bars of the cover plate can likewise extend at the same angle, essentially at a right angle, to the longitudinal axis of the shoe as the bars 25 and the bars of the cover plate 24 can respectively be aligned with the associated bars at the left and the right side of the recess 29. In this manner a continuous active surface arises in the ball region of the sole 20 formed by parallel bars 25, by which a particularly effective engagement with the bars 15 of the pedal surface 11 of the pedal is ensured. Only the actuating surface 28 for the brake device of the pedal thereby interrupts the run of the bars in a region of the active surface.

At the sole 20 a positioning abutment 22 is provided at the rear end of the region provided with the bars 25 and comes into contact with a pedal side abutment 12. In this position shown in FIG. 1 the axis of movement 32 of the joint 31 of the large toe 30 close to the foot of a foot received in the shoe 2 lies vertically above the axis of rotation 14 of the pedal 1. This position of the foot 3 with respect to the pedal axis 14 permits an ergonomically particularly ideal force transmission between the foot and the pedal since the pressure forces exerted by the foot onto the sole 20 of the shoe when pedalling via the joint 31 and the ball 33 located beneath it are fed directly into the pedal axle 14 and thus into the pedal crank without thereby generating an undesired tilting moment of the pedal 1 about the pedal axis 14. Consequently, with this arrangement, the pedal force generated by the cyclist can be essentially fully exploited for the driving of the bicycle.

Figure 7:
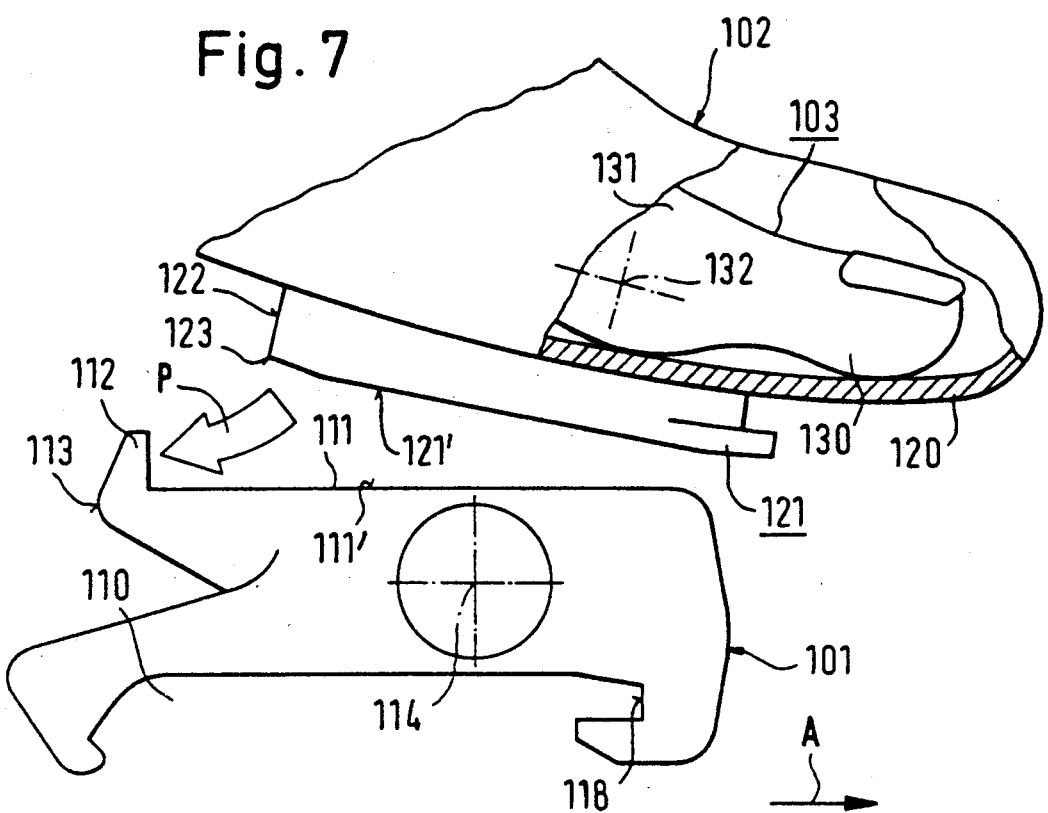

FIG. 7 shows a cycle safety pedal 101 that is rotatably journalled about a pedal axis 114 on a non-illustrated pedal crank. The pedal 101 has at its lower side a receiving device or a latch 110 for the plate 121 of a cyclist's shoe 102.

At the upper pedal face remote from the receiving device 110 the pedal 101 is provided with an essentially flat pedal face 111'. The pedal face 111 has at its rear edge 113 with respect to the direction of travel A an abutment 112 which projects upwardly out of the pedal surface 111'.

The plate 121 is attached to the cyclist's shoe 102 at its sole 120 in the front region and is normally formed for engagement with the receiving device 110 of the pedal 101. The plate 121 has at its rear edge 123 a positioning abutment 122 which extends essentially vertical to the lower surface 121' of the plate 121. The positioning abutment 122 can however also be formed directly on the sole 120.

When placing the shoe 102 on the pedal face 111 of the pedal 101 the front region of the plate 121 is first placed onto the pedal surface 111' and then the shoe is moved rearwardly and downwardly in the sense of the arrow P so that the shoe side positioning abutment 122 comes into contact with the pedal side abutment 112. In this position shown in FIG. 8 the axis of movement 132 of the joint 131 of the large toe 130 close to the foot of a foot received in the shoe 102 also lies vertically above the axis of rotation 114 of the pedal 101.

The same ergonomically favourable alignment of the shoe on the pedal can also be obtained when using the receiving device 110 for the plate 121 if, in the region of the receiving device 110, a pedal side abutment 118 is likewise provided for the shoe side positioning abutment 122.

Figure 8:
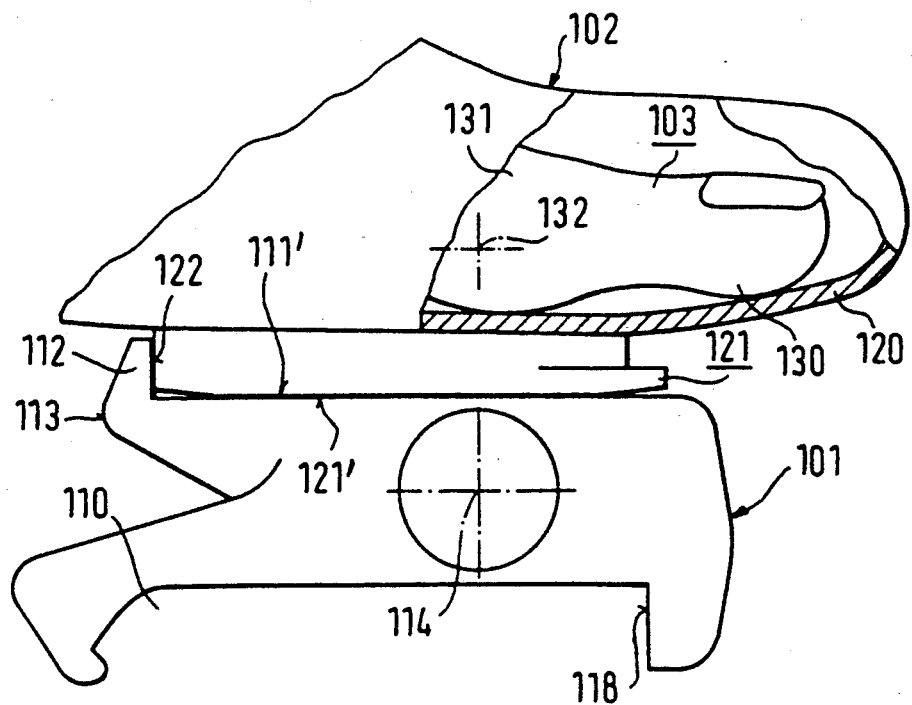

With the positioning of the shoe 102 shown in FIG. 8 on the pedal 101 the ergonomically favourable position of the shoe 102 on the pedal 101 can be improved in that both the pedal face 111 and also the lower surface 121' of the plate 121 or, when the plate 121 is arranged sunk in the sole 120, the sole 120 are provided with a profile-like contour such as has been described in conjunction with the first embodiment.

We claim:

1. A bicycle pedal arrangement comprising:
   a bicycle pedal pivotable about a transverse axis having a front end, a rear end and a first contoured side and a second side between the ends, said first contoured side including a plurality of transversely extending bars forming a plurality of grooves therebetween, said bars having a semi-trapezoidal cross-section and defining a vertical surface and an inclined surface when said first side is horizontally disposed and faces upwardly; and
   a bicycle shoe having an upper portion and a lower portion, said lower portion including a sole having a lower surface including a contoured region formed by a plurality of transversely extending bars, the bars defining a plurality of grooves therebetween and having a semi-trapezoidal cross-section defining an inclined bar side and a vertical bar side sized to releasably engage the bars on the pedal when said sole is placed on said first pedal side in an interlocking, force-transmitting manner.

2. A bicycle pedal arrangement as claimed in claim 1 wherein said vertical surface of said bars on said pedal faces towards said front end of said pedal.

3. A bicycle pedal arrangement as claimed in claim 1 wherein said vertical bar side on said shoe sole faces a rear end of said sole.

4. A bicycle pedal arrangement as in claim 1 wherein said bars of said first side of said pedal are spaced apart from one another so that the groove defined therebetween receives two bars of said sole.

5. A bicycle pedal arrangement as in claim 1 wherein said bars of said lower surface of said sole are spaced apart from one another so that the groove defined therebetween receives two bars of said first side of said pedal.

6. A bicycle pedal arrangement as claimed in claim 4 wherein the spacing between the bars of said lower surface of said sole is 3 to 7 mm.

7. A bicycle pedal arrangement as claimed in claim 5 wherein the spacing between the bars of said first side of said pedal is 3 to 7 mm.

8. A bicycle pedal arrangement as claimed in claim 1 wherein said sole includes a recess and a plate located in the recess for engagement with said second side of said pedal when said second side is horizontally disposed and faces upwardly.

9. A bicycle pedal arrangement as claimed in claim 8 further including a cover plate located in said recess of said sole and defining said bars on said sole for engaging in an interlocking manner the bars of said first side of said pedal.

10. A bicycle pedal arrangement as claimed in claim 9 wherein said cover plate is symmetrical with respect to a longitudinal axis of said sole.

11. A bicycle pedal arrangement as claimed in claim 1 wherein said second side of said pedal has at least one abutment located proximate the rear end of said pedal when said second side is pivoted about said transverse axis to a horizontally, upwardly disposed position, said sole including a cooperating positioning member located for engaging said abutment on the second side of the pedal when said sole is brought into engagement with said second side of said pedal.

12. A bicycle pedal arrangement as claimed in claim 11 wherein said abutment of said second side of said pedal is formed from an elastic material.

13. A bicycle pedal arrangement as claimed in claim 12 wherein said elastic material is rubber.

14. A bicycle pedal arrangement as claimed in claim 11 wherein said member of said sole and said abutment of said second side of said pedal are formed to locate the shoe in a longitudinal direction of said shoe such that a portion of the shoe sole beneath where an axis of movement of a joint of a big toe of a user of the shoe lies is vertically above said transverse axis of said pedal.

15. A bicycle pedal arrangement as claimed in claim 8 wherein said second side of said pedal has a latch and an abutment for latching engagement with said plate of said sole, wherein in the horizontally disposed position of said second side of said pedal said abutment is located at the rear end of said pedal and said latch is located at said forward end of said pedal.

16. A bicycle pedal arrangement comprising:
a pivotable bicycle pedal having a front end, a rear end and a first contoured side and a second side between the ends, said first contoured side including a plurality of transversely extending bars forming a plurality of grooves therebetween, said bars having a semi-trapezoidal cross-section and defining a forward facing vertical surface and a rearward facing inclined surface when said first side is horizontally disposed and faces upwardly; and
a bicycle shoe having an upper portion and a lower portion, said lower portion including a sole having a lower surface including a contoured region formed by a plurality of transversely extending bars flush with a remainder of the lower surface of the sole, the bars defining a plurality of grooves therebetween, said bars having a semi-trapezoidal cross-section defining an inclined bar side and a vertical bar side sized to releasably engage the bars on the pedal when said sole is placed on said first pedal side in an interlocking, force-transmitting manner, the vertical bar sides facing a rear end of said sole.

* * * * *